United States Patent [19]

Schlafer et al.

[11] 4,035,351

[45] July 12, 1977

[54] WATER-SOLUBLE MONOAZO DYESTUFF CONTAINING A PHENYLENE DIAZO COMPONENT

[75] Inventors: Ludwig Schlafer, Fischbach, Taunus; Ernst Hoyer, Frankfurt am Main, both of Germany

[73] Assignee: Hoechst Aktiengesellschaft, Frankfurt am Main, Germany

[21] Appl. No.: 576,735

[22] Filed: May 12, 1975

Related U.S. Application Data

[63] Continuation of Ser. No. 380,838, July 19, 1973, abandoned.

[30] Foreign Application Priority Data

July 22, 1972 Germany .......................... 2236107

[51] Int. Cl.² .................... C09B 29/06; D06P 1/06; D06P 3/24; D06P 3/66
[52] U.S. Cl. ...................... 260/196; 260/453 R; 260/458 R; 260/508; 260/570.5 P; 260/575; 260/944
[58] Field of Search .................................. 260/196

[56] References Cited

U.S. PATENT DOCUMENTS

| | | | |
|---|---|---|---|
| 2,670,265 | 2/1954 | Heyna et al. ............................ | 8/49 |
| 3,135,730 | 6/1964 | Heyna et al. ....................... | 260/147 |
| 3,197,456 | 7/1965 | Kuhne et al. ....................... | 260/163 |
| 3,426,008 | 2/1969 | Meininger et al. ................. | 260/151 |
| 3,655,642 | 4/1972 | Meininger et al. ................. | 260/194 |

*Primary Examiner*—Floyd D. Higel

*Attorney, Agent, or Firm*—Curtis, Morris & Safford

[57] ABSTRACT

Water-soluble monoazo-dyestuff of the formula

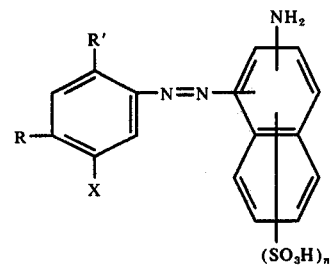

in which R is alkoxy from 1 to 4 carbon atoms, alkyl from 1 to 4 carbon atoms, alkyl from 1 to 4 carbon atoms, chlorine or bromine, R' is hydrogen, lower alkoxy from 1 to 4 carbon atoms, lower alkyl from 1 to 4 carbon atoms, chlorine or bromine, and X is $-SO_2-CH=CH_2$, $-SO_2-CH_2-CH_2-OH$, $-SO_2-CH_2-CH_2-Cl$, $-SO_2-CH_2-CH_2-O-SO_3H$, $-SO_2-CH_2-CH_2-S-SO_3H$, $-SO_2-CH_2-CH_2-O-PO_3H_2$, $-SO_2-CH_2-CH_2-N$ (lower alkyl)$_2$ or $[-SO_2-CH_2-CH_2-N$ (lower alkyl)$_3]^{(+)}$halide$^{(-)}$, said dyestuffs being highly suitable for the dyeing or printing of leather, wool, silk, polyurethane and polyamide fibres, particularly, however, of native or regenerated cellulose fibres in the presence of alkaline agents, the dyeings and prints obtainable on cellulose fibres being distinguished by good to very good fastness properties to light and to wetting.

5 Claims, No Drawings

WATER-SOLUBLE MONOAZO DYESTUFF CONTAINING A PHENYLENE DIAZO COMPONENT

This is a continuation, of application Ser. No. 380,838, filed July 19, 1973, now abandoned.

The present invention relates to novel water soluble monoazo dyestuffs of the general formula (1)

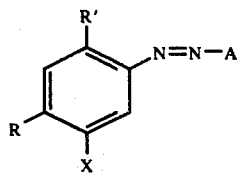

(1)

wherein R is alkoxy having 1 to 4 carbon atoms, preferably methoxy or ethoxy, alkyl having 1 to 4 carbon atoms or halogen preferably chlorine or bromine, R' is hydrogen, alkoxy having 1 to 4 carbon atoms, alkyl having 1 to 4 carbon atoms or halogen, preferably chlorine or bromine, X is the β-hydroxyethylsulfonyl group, the vinylsulfonyl or ethylsulfonyl substituted in β-position by an organic or inorganic radical capable of being split off by an alkaline agent, and A is the radical of a α- or β-naphthyl-amino-mono-, di- or trisulfonic acid, as well as to a process for preparing these dyestuffs, which comprises a. coupling diazotized aromatic amines of the formula (2)

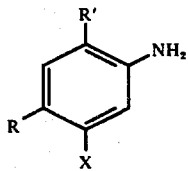

(2)

wherein R, R' and X are as defined above with α- or β-naphtylamino-mono-, di- or trisulfonic acids or b. in a monoazo dyestuff of the general formula (1), wherein X is β-hydroxyethylsulfonyl group, converting this group in known manner either into the vinylsulfonyl group or into an ethylsulfonyl group substituted in β-position by an organic or inorganic radical capable of being split off by an alkaline agent.

As organic or inorganic radicals capable of being split off by an alkaline agent may be mentioned, for example, halogen, preferably chlorine or bromine, lower alkylsulfonic acid ester or amide groups, arylsulfonic-acid ester or amide groups, preferably the phenyl or toluyl-sulfonic acid ester- or amide group, lower acyloxy groups, such as for example the acetoxy group, the phenoxy group, the dimethyl amino or diethylamino group, the trialkyl-ammonium group, the hydroxy group, the thio-sulfuric acid ester group, the phosphoric acid ester group and, especially, the sulfuric acid ester group.

In the preferred embodiment of the invention, the water-soluble monoazo dyestuffs have the formula

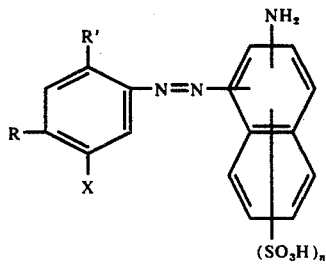

in which R represents alkoxy from 1 to 4 carbon atoms, alkyl from 1 to 4 carbon atoms, chlorine or bromine, R' represents hydrogen, lower alkoxy from 1 to 4 carbon atoms, lower alkyl from 1 to 4 carbon atoms, chlorine or bromine, and X represents $-SO_2-CH=CH_2$, $-SO_2-CH_2-CH_2-OH$, $-SO_2-CH_2-CH_2-Cl$, $-SO_2-CH_2-CH_2-O-SO_3H$, $-SO_2-CH_2-CH_2-S-SO_3H$, $-SO_2-CH_2-CH_2-O-PO_3H_2$, $-SO_2-CH_2-CH_2-N(\text{lower alkyl})_2$ or $[-SO_2-CH_2-CH_2-N(\text{lower alkyl})_3]^{(+)}$ halide$^{(-)}$.

The conversion of dyestuffs of the general formula (1), wherein X is $-SO_2-CH_2-CH_2-OH$, into dyestuffs of the formula (1), in which X is the group $-SO_2-CH_2-CH_2-OSO_3H$, is effected in known manner with sulfatizing agents, such as for example, concentrated anhydrous sulfuric acid, chlorosulfonic acid, aminosulfonic acid or agents yielding sulfur trioxide.

To convert dyestuffs of the general formula (1), in which X is $-SO_2-CH_2-CH_2-OH$, into dyestuffs of the formula (1), in which X is $-SO_2-CH_2-CH_2-O-PO_3H_2$ phosphorylating agents are used, such as concentrated orthophosphoric acid, pyrophosphoric acid and polyphosphoric acid. Dyestuffs of the general formula (1), wherein X stands is alkyl or arylsulfonic acid ester group or an acyloxy group, can be obtained, for example, from those dyestuffs of the formula (1), in which X is $-SO_2-CH_2-CH_2-OH$, by reacting them in known manner with an alkyl or arylsulfonic acid chloride or with a carboxylic acid chloride or anhydride. Dyestuffs of the formula (1), in which X is ethylsulfonyl substituted in β-position by a thiosulfuric acid ester or a dialkylamino, are prepared in known manner from dyestuffs of the formula (1), in which X is $-SO_2-CH=CH_2$, by reacting with salts of the thiosulfuric acid or by reacting with a dialkylamine, such as dimethyl amine. The aromatic amines of the formula (2) for preparing the new monoazo dyestuffs in which X is $-SO_2-CH_2-CH_2-OH$, can be prepared, for example, by converting the substituted acetamino- or nitrobenzene-sulfochlorides into the sulfinic acids, converting these with ethylene oxide or β-chloroethanol into the acetamino- or nitro-(β-hydroxyethylsulfonyl)- benzenes and saponifying these compounds in an acidic medium, or, if a nitro group is present, reducing this group to the amino group catalytically or by another suitable process.

The amines thus obtained of the formula (2 in which X is $-SO_2-CH_2-CH_2-OH$, may be converted according to known processes into amines of the formula (2), in which X is either vinylsulfonyl or ethylsulfonyl substituted in β-position by organic or inorganic radicals capable of being split off by alcohol, and which may serve at the same time as starting materials for preparing the new monoazo dyestuffs.

The amines of the general formula (2), in which X is $-SO_2-CH_2-CH_2-OSO_3H$ can also been prepared by treating the N-acetyl compound of the amines of the formula (2), in which X is $-SO_2-CH_2-CH_2OH$, with sulfuric acid at an elevated temperature or by reducing the corresponding nitro compounds.

The corresponding phosphoric acid esters of the formula (2), in which X is $-SO_2-CH_2-CH-$ $_2$—OPO$_3$H$_2$ can be prepared by esterifying starting compounds of the formula (2), in which X is —SO$_2$—CH$_2$—CH$_2$—OH, with orthophosphoric acid, pyrophosphoric acid, polyphosphoric acid or phosphoroxy chloride.

The monoazo dyestuffs obtained according to the process described are isolated by salting out, for example, with sodium or potassium chloride or by spray-drying the preparation mixture.

The monoazo dyestuffs obtained according to the process described are very suitable for dyeing and printing fibre materials containing nitrogen, such as for example wool, silk, leather, polyurethane and polyamide fibre materials, especially regenerated or natural cellulose fibre materials, such as cotton, spun rayon, viscose rayon and linen. They may be preferably used according to the dyeing and printing processes generally used for reactive dyestuffs on an industrial scale, and yield for example on cellulose fibres in the presence of alkaline agents, intense dyeings and prints having good to very good fastnesses to light and to wetting. The dyestuffs according to the invention have an excellent color build-up and have a very good absorption when dyeing from a long bath.

As compared with the monoazo dyestuffs known from German Offenlegungsschrift No. 1,911,427 having a similar structure, the monoazo dyestuffs obtained according to the invention are superior with regard to color build-up in dyeing and printing processes usual for reactive dyestuffs, with regard to their absorption rate, their fastness to wetting and their resistance to chlorine.

The following Examples illustrate the invention. Parts and percentages are by weight unless stated otherwise.

EXAMPLE 31.1 Parts of 4-methoxy-1-aminobenzene-3β- sulfatoethylsulfone, were dissolved until neutral in 100 parts by volume of water, mixed with 30 parts by volume of a 37% hydrochloric acid and diazotized at 0° – 5° C with 20 parts by volume of a 5N sodium nitrite solution. 30.3 Parts of 2-naphthylamino 3,6-disulfonic acid were dissolved until neutral in 100 parts by volume of water and combined with the suspension of the diazonium salt. A pH-value of 2 to 4 was maintained and the mixture was stirred for 1 hour. The monoazo dyestuff was salted out by addition of sodium chloride, suction-filtered and washed with a 15% sodium chloride solution. After drying at 80° to 100° C 70 parts of an about 65% salt-containing dyestuff were obtained, which corresponded in the form of the free acid to the formula

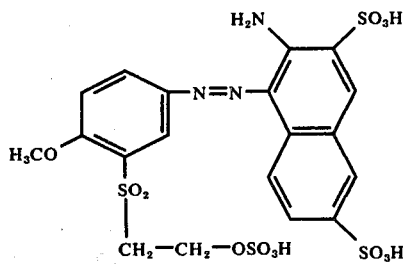

According to the dyeing methods usual for reactive dyestuffs the dyestuff yielded on wool, silk, polyamide and polyurethane fibre materials and on cellulose fibre materials clear golden yellow dyeings and prints having an excellent build-up, which are distinguished by their good fastnesses to light and to wetting as well as by an excellent resistance to chlorine and to other oxydating agents. Used from a long bath the dyestuff exhausted very well onto cotton. The prints showed a high sharpness of the outlines and a purity of the white bottom.

EXAMPLE 2

A neutral solution of 62.5 parts of the dyestuff of Example 1 in 2000 parts by volume of water were adjusted to pH 11 to 12 at 25° to 30° C with concentrated sodium hydroxide solution, stirred for half an hour and then adjusted again to pH 5 to 6. 37.5 Parts of crystallized sodium thiosulfate were added and stirred for 6 hours at 60° C – 65° C. The pH-value was maintained constant by addition of diluted acetic acid. The dyestuff solution was filtered hot and spray-dried. A brown powder was obtained which dissolved very well in water. The dyestuff obtained corresponded in the form of the free acid to the formula

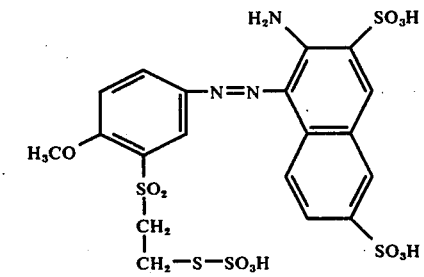

According to the processes of application usual for reactive dyestuffs the dyestuff provided on wool, silk, polyamide, polyurethane and cellulose fibre materials clear golden yellow dyeings and prints having the good fastness properties mentioned in Example 1. The good fastness to chlorine bathing water and to chlorine bleaching can be especially mentioned.

EXAMPLE 3

A neutral solution of 62.5 parts of the dyestuff of Example 1 in 2000 parts by volume of water was mixed at 30° C with 80 parts of diethyl amine. By dropwise addition of concentrated sodium hydroxide solution the pH value was adjusted to 12–12.5 and stirred for 12 hours at room temperature. Then a pH value of 5 to 6 was adjusted with hydrochloric acid, and the dyestuff was salted out with a 15% marine salt, isolated with a suction-filter and dried in vacuo. 75 Parts of an about 70% dyestuff were obtained, which in the form of the free acid corresponded to the formula.

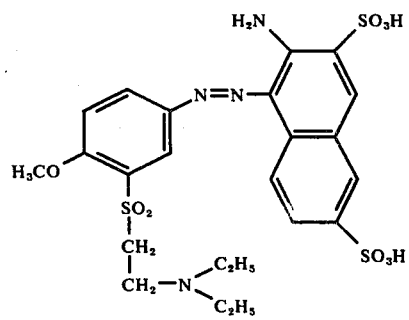

In the presence of alkaline agents the dyestuff provided on fibres and cellulose fibres containing nitrogen, clear golden yellow dyeings and prints having the good fastness properties mentioned in Example 1. At a temperature of 20° C, printing pastes of the dyestuff containing alkaline agents show a resistance of several months.

EXAMPLE 4

23.1 Parts of 4-methoxy-1-aminobenzene-3-β-hydroethylsulfone were dissolved in 200 parts by volume of water by addition of 40 parts of concentrated hydrochloric acid and diazotized at 0° – 5° C with 20 parts by volume of a 5N sodium nitrite solution. Then 30.3 parts of 2-napthylamino-3,7-disulfonic acid were dissolved until neutral in 100 parts by volume of water and mixed with the solution of the diazonium salt; by addition of crystallized sodium acetate a pH value of 1 to 3 was maintained. After several hours the dyestuff was salted out with sodium chloride, collected on the suction filter and dried at 100° C, if desired in vacuo. 55 Parts of an about 90% salt-containing dyestuff was obtained which corresponded in the form of the free acid to the formula

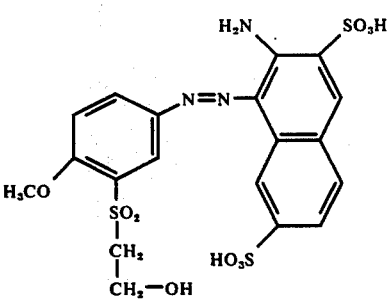

In the presence of alkaline agents printed and then thermofixed on cellulose fibres, the dyestuff provided prints fast to washing and to light having a reddish yellow shade, which show an excellent resistance to agents yielding chlorine.

EXAMPLE 5

The dyestuff obtained according to Example 4 was introduced in the course of one hour into a mixture of 85 parts of a 80% orthophosphoric acid (85% $P_2O_5$) and 15 parts of a 80% orthophosphoric acid at a temperature of 130° C. Stirring was continued for 1 to 2 hours until complete dissolution. Then the reaction mixture was poured into 150 parts by volume of water and stirred for 2 hours at 80° – 90° C. The whole was salted out with potassium chloride and the phosphoric acid ester precipitated of the dyestuff was suction-filtered. The dyestuff thus-obtained corresponded in the form of the free acid to the formula

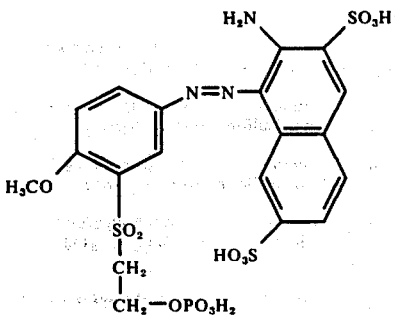

The moist filter cake was dissolved in 200 parts by volume of water, adjusted to neutral with calcinated soda and the solution was spray-dried. 78 Parts of an about 70% dyestuff of the above-mentioned constitution was obtained, which had an excellent solubility in water. According to the application processes usual for reactive dyestuffs it provided on wool, silk, polyamide, polyurethane and cellulose fibre materials clear reddish yellow dyeings and prints of a good fastness to light and to wetting and a very good fastness to chlorine bathing water and to chlorine bleaching.

EXAMPLE 6

The dyestuff obtained according to Example 4 was introduced at room temperature into 170 parts of concentrated sulfuric acid and stirred until completely dissolved. Then the reaction mixture was poured, while stirring, onto 500 parts of ice and adjusted to neutral with 176 parts of calcinated soda. Precipitation of the dyestuff was completed with addition of potassium chloride.

After drying in vacuo at 100° C 78 parts of a 65% dyestuff were obtained; it corresponded in the form of the free acid to the formula

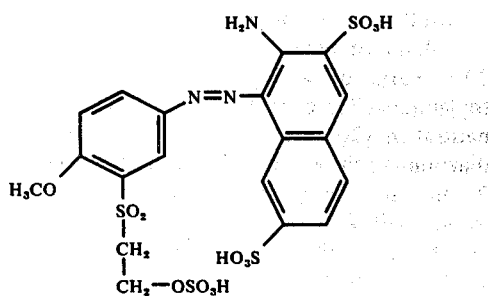

The dyestuff provided on fibre materials containing nitrogen and on cellulose fibre materials — when applied according to methods usual for reactive dyestuffs — clear reddish yellow dyeings and prints having a good fastness to wetting and to light as well as a very good resistance to chlorine and to oxidizing agents.

EXAMPLE 7

65.5 g of the dyestuff of the formula

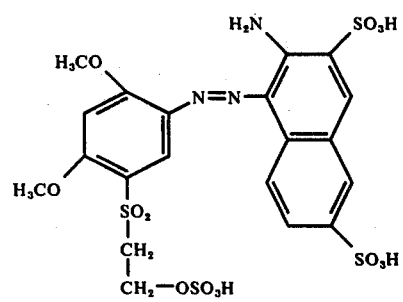

were introduced into 1000 parts by volume of water and adjusted at 25° — 30° C with sodium hydroxide solution to a Ph-value of 11 to 12; the whole was stirred for half an hour, adjusted again to pH 5 and salted out with marine salt. 62 Parts of a brown red powder were obtained, which contained 80% of the dyestuff, which corresponded in the form of the free acid to the formula

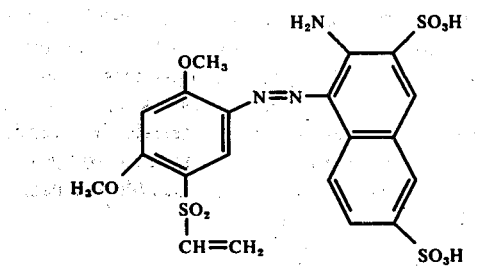

The dyestuff provided on wool, silk, polyamide and polyurethane fibre materials and on cellulose fibres clear yellowish orange dyeings and prints having a good build-up, which are distinguished by their good fastness to light and to wetting and a very good resistance to the action of agents yielding chlorine and to oxydating agents.

The prints showed a high sharpness of the outlines and a purity of the white bottom.

EXAMPLE 8

32.5 Parts of 4-ethoxy--aminobenzene -3β-sulfato-ethylsulfone were dissolved until neutral in 100 parts by volume of water, acidified and diazotized as usual. 22.3 Parts of a preparation mixture of 2-naphthylaminosulfonic acid-6-and -7 were dissolved until neutral in 120 parts of water and combined with the diazonium salt. At pH 2 to 4 the mixture was stirred for 2 hours and the dyestuff was precipitated with 15% of marine salt. After the usual working up 70 parts of an about 72% salt-containing dyestuff were obtained which corresponded in the form of the free acid to the formula

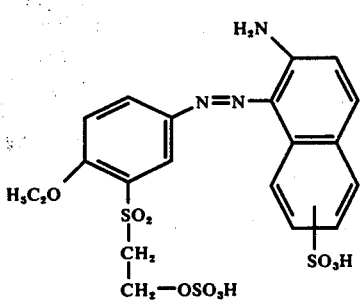

According to the dyeing and printing methods usual for reactive dyestuffs, the dyestuff provided on fibres containing nitrogen and on cellulose fibres yellowish orange dyeings and prints having an excellent build-up, which are distinguished by a good fastness to light, to wetting and to chlorine. The dyestuff exhausted very well onto cotton, when used from a long bath.

The dyestuffs listed in the following Table can and could be prepared in similar way, as described in the preceding Examples. They provided on wool, silk, polyamide, polyurethane and cellulose fibre materials dyeings and prints having the fastness properties already mentioned.

The Examples of the text and the Table do not restrict in any respect the subject of the invention.

| | Diazo component | Coupling component | Shade on cotton |
|---|---|---|---|
| 1 | 4-methoxy-1-amino-benzene-3-β-sulfato-ethylsulfone | 1-naphthylamino-3,6-disulfonic acid | orange |
| 2 | 4-methoxy-1-amino-benzene-3-β-sulfato-ethylsulfone | 1-naphthylamino-3,7-disulfonic acid | orange |
| 3 | 4-methoxy-1-amino-benzene-3-β-sulfato-ethylsulfone | 1-naphthylamino-3,8-disulfonic acid | orange |
| 4 | 4-methoxy-1-amino-benzene-3-β-sulfato-ethylsulfone | 1-naphthylamino-4,7-disulfonic acid | orange |
| 5 | 4-methoxy-1-amino-benzene-3-β-sulfato-ethylsulfone | 2-naphthylamino-5,7-disulfonic acid | yellow, reddish |
| 6 | 4-methoxy-1-amino-benzene-3-β-phosphato ethylsulfone | 1-naphthylamino-4-sulfonic acid | orange |
| 7 | 4-methoxy-1-amino-benzene-3-β-phosphato-ethylsulfone | 1-naphthylamino-5-sulfonic acid | orange |
| 8 | 4-methoxy-1-amino-benzene-3-β-phosphato-ethylsulfone | 1-naphthylamino-4,8-disulfonic acid | red, yellish |
| 9 | 4-methoxy-1-amino-benzene-3-β-phosphato-ethylsulfone | 2-naphthylamino-5-sulfonic acid | yellow, reddish |
| 10 | 4-methoxy-1-amino-benzene-3-β-phosphato-ethylsulfone | 2-naphthylamino-6-sulfonic acid | yellow, reddish |
| 11 | 4-methoxy-1-amino-benzene-3-β-phosphato-ethylsulfone | 2-naphthylamino-7-sulfonic acid | yellow, reddish |
| 12 | 4-chloro-1-amino-benzene-3-β-sulfato-ethylsulfone | 2-naphthylamino-3,6-disulfonic acid | yellow, reddish |
| 13 | 2-chloro-4-methyl-1-amino-benzene-5-β-sulfato ethylsulfone | 2-naphthylamino-3,6-disulfonic acid | yellow, reddish |
| 14 | 2-chloro-4-methoxy-1-amino-benzene-5-β-sulfate ethylsulfone | 2-naphthylamino-3,6-disulfonic acid | orange, yellowish |
| 15 | 2,4-dimethyl-1-aminobenzene-5-β-sulfato ethylsulfone | 2-naphthylamino-3,6-disulfonic acid | orange |
| 16 | 2,4-diethoxy-1-amino-benzene-5-β-sulfato-ethylsulfone | 2-naphthylamino-3,7-disulfonic acid | orange |
| 17 | 2-methyl-4-methoxy-1-amino-benzene-5-β-sulfato-ethylsulfone | 2-naphthylamino-3,7-disulfonic acid | orange |
| 18 | 4-methyl-1-amino-benzene-3-β-sulfato-ethylsulfone | 2-naphthylamino-3,7-disulfonic acid | yellow reddish |
| 19 | 4-chloro-1-amino-benzene-3-vinyl-sulfone | 2-naphthylamino-3,7-disulfonic acid | yellow reddish |
| 20 | 4-chloro-1-amino-benzene-3-vinylsulfone | 2-naphthylamino-5,7-disulfonic acid | yellow reddish |
| 21 | 4-chloro-1-amino-benzene-3-vinylsulfone | 1-naphthylamino-3,6-disulfonic acid | orange |
| 22 | 4-chloro-1-amino-benzene-3-vinylsulfone | 1-naphthylamino-3,7-disulfonic acid | orange |
| 23 | 4-chloro-1-amino-benzene-3-vinyl-sulfone | 1-naphthylamino-3,6,8-trisulfonic acid | orange |
| 24 | 4-methoxy-1-amino- | 1-naphthylamino-3,6,8 | orange |

| | Diazo component | Coupling component | Shade on cotton |
|---|---|---|---|
| | benzene-3-vinyl-sulfone | 8-trisulfonic acid | |
| 25 | 4-methoxy-1-amino-benzene-3-vinyl-sulfone | 1-naphthylamino-3,7-disulfonic acid | orange |
| 26 | 4-methoxy-1-amino-benzene-3-vinyl-sulfone | 1-naphthylamino-3,6-disulfonic acid | orange |
| 27 | 4-methoxy-1-amino-benzene-3-vinyl-sulfone | 2-naphthylamino-5,7-disulfonic acid | yellow reddish |
| 28 | 4-methoxy-1-amino-benzene-3-vinyl-sulfone | 2-naphthylamino-3,6-disulfonic acid | golden yellow |
| 29 | 2,4-dimethoxy-1-amino-benzene-5-β-thiosulfato-ethylsulfone | 2-naphthylamino-3,6-disulfonic acid | orange |
| 30 | 2,4-dimethyl-1-amino-benzene-5-β-thio-sulfato-ethylsulfone | 2-naphthylamino-3,7-disulfonic acid | orange |
| 31 | 4-chloro-1-amino-benzene-3-β-thio-sulfato-ethylsulfone | 2-naphthylamino-3,6-disulfonic acid | yellow, reddish |
| 32 | 4-ethoxy-1-amino-benzene-3-β-thio-sulfato-ethylsulfone | 2-naphthylamino-3,6-disulfonic acid | golden yellow |
| 33 | 4-methyl-1-amino-benzene-3-β-thio-sulfato-ethylsulfone | 2-naphthylamino-3,6-disulfonic acid | yellow, reddish |
| 34 | 4-methoxy-2-methyl-1-aminobenzol-5-β-thio-sulfato-ethylsulfone | 2-naphthylamino-3,6-disulfonic acid | orange |
| 35 | 4-methoxy-1-amino-benzene-3-β-sulfato-ethylsulfone | 2-naphthylamino-3,6-disulfonic acid | golden yellow |
| 36 | 4-methoxy-1-amino-benzene-3-β-thio-sulfato-ethylsulfone | 2-naphthylamino-3,7-disulfonic acid | golden yellow |
| 37 | 4-methoxy-1-amino-benzene-3-β-thio-sulfato-ethylsulfone | 2-naphthylamino-5,7-disulfonic acid | yellow, reddish |
| 38 | 4-methoxy-1-amino-benzene-3-β-thio-sulfato-ethylsulfone | 2-naphthylamino-5-sulfonic acid | yellow, reddish |
| 39 | 4-methoxy-1-amino-benzene-3-β-thio-sulfato-ethylsulfone | 2-naphthylamino-6-sulfonic acid | yellow, reddish |
| 40 | 4-methoxy-1-amino-benzene-3-β-thio-sulfato-ethylsulfone | 2-naphthylamino-7-sulfonic acid | yellow, reddish |
| 41 | 4-methoxy-1-amino-benzene-3-β-sulfato-ethylsulfone | 1-naphthylamino-3,6-disulfonic acid | orange |
| 42 | 4-methoxy-1-amino-benzene-3-β-thio-sulfato-ethylsulfone | 1-naphthylamino-3,6,8-trisulfonic acid | orange |
| 43 | 4-methoxy-1-amino-benzene-3-β-thio-sulfato-ethylsulfone | 1-naphthylamino-4,7-disulfonic acid | orange |
| 44 | 4-methoxy-1-amino-benzene-3-β-thio-sulfato-ethylsulfone | 1-naphthylamino-4,8-disulfonic acid | red, yellowish |
| 45 | 4-methoxy-1-amino-benzene-3-β-thio-sulfato-ethylsulfone | 1-naphthylamino-3,8-disulfonic acid | orange |
| 46 | 4-methoxy-1-amino-benzene-3-β-diethyl- | 2-naphthylamino-3,7-disulfonic | yellow, reddish |
| | amino-ethylsulfone | acid | |
| 47 | 4-methyl-1-amino-benzene-3-β-diethyl-amino-ethylsulfone | 2-naphthylamino-3,6-disulfonic acid | yellow, reddish |
| 48 | 4-chloro-1-amino-benzene-3-β-diethyl-sulfone | 2-naphthylamino-3,6-disulfonic acid | yellow, reddish |
| 49 | 2,4-dimethoxy-1-amino-benzene-5-β-diethyl-amino-ethylsulfone | 2-naphthylamino-3,6-disulfonic acid | orange |
| 50 | 2,4-dimethyl-1-amino-benzene-5-β-diethyl-amino-ethylsulfone | 2-naphthylamino-3,6-disulfonic acid | orange |
| 51 | 2-chloro-4-methoxy-1-amino-benzene-5-β-dimethyl-amino-ethylsulfone | 2-naphthylamino-3,6-disulfonic acid | orange |
| 52 | 2-chloro-4-methyl-1-amino-benzene-5-β-dimethylamino-ethylsulfone | 2-naphthylamino-3,6-disulfonic acid | yellow, reddish |
| 53 | 4-methoxy-1-amino-3-(β-trimethylammonium-ethyl-sulfonyl)-benzene-hydro-chloride | 2-naphthylamino-3,6-disulfonic acid | golden yellow |
| 54 | 4-methoxy-1-amino-3-(β-trimethylammoniumethyl-sulfonyl)-benzene-hydro-chloride | 2-naphthylamino-3,7-disulfonic acid | yellow reddish |
| 55 | 4-methoxy-1-amino-benzene-3-β-chloro-ethylsulfone | 2-naphthylamino-3,7-disulfonic acid | yellow, reddish |
| 56 | 4-methoxy-1-amino-benzene-3-β-chloro-ethylsulfone | 2-naphthylamino-3,6-disulfonic acid | golden yellow |
| 57 | 4-methoxy-1-amino-benzene-3-β-chloro-ethylsulfone | 1-naphthylamino-3,6,8-trisulfonic acid | orange |
| 58 | 4-bromo-1-amino-benzene-3-β-sulfato-ethylsulfone | 2-naphthylamino-3,6-disulfonic acid | yellow reddish |

We claim:

1. A water-soluble monoazo dyestuff of the formula

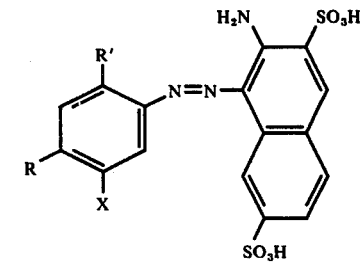

wherein R is alkoxy of 1 to 4 carbon atoms, alkyl of 1 to 4 carbon atoms, chlorine or bromine, R' is hydrogen, lower alkoxy of 1 to 4 carbon atoms, lower alkyl of 1 to 4 carbon atoms, chlorine or bromine, and X is $-SO_2-CH=CH_2$, $-SO_2-CH_2-CH_2OH$, $-SO_2-CH_2-CH_2-Cl$, $-SO_2-CH_2-O-SO_3H$, $-SO_2-CH_2-CH_2-S-SO_3H$, $-SO_2-CH_2-CH_2-O-PO_3H_2$, $-SO_2-CH_2-CH_2-N$ (lower alkyl)$_2$ or $[-SO_2-CH_2-CH_2-N$ (lower alkyl)$_3]^{(+)}$ halide$^{(-)}$.

2. A water soluble monazo dyestuff of the formula

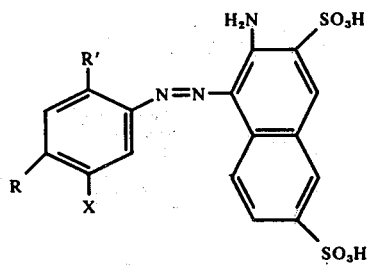

wherein R is alkoxy of 1 4 carbon atoms, alkyl of 1 to 4 carbon atoms, chlorine or bromine, R' is hydrogen, lower alkoxy of 1 to 4 carbon atoms, lower alkyl of 1 to 4 carbon atoms, chlorine or bromine, and X is $-SO_2-CH=CH_2, -SO_2CH_2-CH_2OH, -SO_2-CH_2-CH_2-Cl, -SO_2-CH_2-O-SO_3H, -SO_2-CH_2-CH_2-S-SO_3H, -SO_2-CH_2-CH_2-O-3H_2 -SO_{O2}-CH_2N$ (lower alkyl)$_2$ or $[-SO_2-CH_2-CH_2-N$ (lower alkyl)$_3]$to $^{(+)}$ halide $^{(-)}$.

3. A water-soluble monoazo-dyestuff dyestuff of the formula

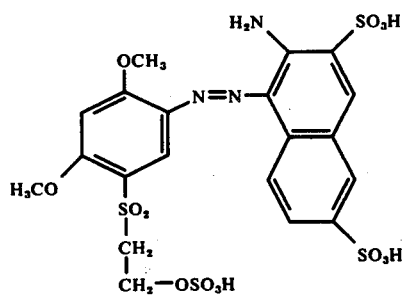

4. The water soluble monoazo-dyestuff of the formula

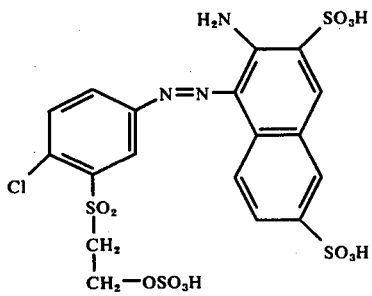

5. The water-soluble monoazo-dyestuff as recited in claim 2 of the formula

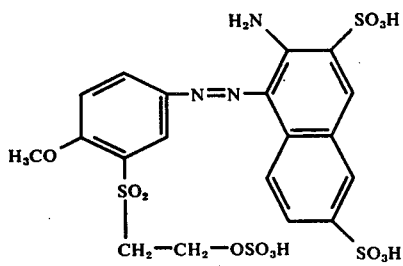

* * * * *